(12) United States Patent
Roberts

(10) Patent No.: US 6,560,393 B2
(45) Date of Patent: May 6, 2003

(54) DISPERSIVE OPTICAL WAVEGUIDE ARRAY

(75) Inventor: Stephen William Roberts, Winchester (GB)

(73) Assignee: Bookham Technology PLC, Oxfordshire (GB)

( * ) Notice: Subject to any disclaimer, the term of this patent is extended or adjusted under 35 U.S.C. 154(b) by 198 days.

(21) Appl. No.: 09/756,197

(22) Filed: Jan. 9, 2001

(65) Prior Publication Data

US 2001/0028777 A1 Oct. 11, 2001

(30) Foreign Application Priority Data

Apr. 5, 2000 (GB) ............................................. 0008425

(51) Int. Cl.$^7$ ............................................... G02B 6/10
(52) U.S. Cl. ......................... 385/130; 385/14; 385/37; 385/129; 385/132
(58) Field of Search ............................. 385/14, 37, 129, 385/130, 131, 31, 32

(56) References Cited

U.S. PATENT DOCUMENTS

| | | | | |
|---|---|---|---|---|
| 6,144,783 A | * | 11/2000 | Epworth et al. ............... | 385/24 |
| 6,222,956 B1 | * | 4/2001 | Akiba et al. ................... | 385/24 |
| 6,377,723 B1 | * | 4/2002 | Saito et al. .................... | 385/15 |
| 6,434,292 B1 | * | 8/2002 | Kim et al. .................... | 359/127 |
| 6,445,847 B1 | * | 9/2002 | Doerr .......................... | 359/120 |

FOREIGN PATENT DOCUMENTS

| | | |
|---|---|---|
| EP | 0639 782 A | 2/1995 |
| GB | 2 316 759 A | 3/1998 |

OTHER PUBLICATIONS

Mu Hee Cho et al, "1–*4 wavelength division demultiplexer by using a multimode interferometer" Ungyong Mulli, Jan. 1999, Koren Phys. Soc., South Korea, vol. 12, No. 1, Jan. 1999 pp. 21–26, XP002182352 ISSN: 1013–7009 abstract.

Patent Abstract of Japan vol., 018, No. 146, (P–1707), Mar. 10, 1994 and JP 05 323246A (Nippon Telegr & Teleph Corp), Dec. 7, 1993, abstract; figures 1,2,6.

Okayama H. et al., "Wavelenght Router Using Bridged Planar Spectrographs" Japanese Journal of Applied Physics, publication Office Japanese Journal of Applied Physics. Tokyo, JP vol. 37, No. 6B, Jun. 1998 p. 3718–3722, XP000860815 ISSN: 0021–4922 pp 3718, paragraph 2–page 3718, paragraph 2.2.

Pearson M. R. T., et al. "Arrayed waveguide grating demultiplexers in silicon–on–insulator" Silicon–based optoelectronics II, San Jose, CA, USA, Jan. 28, 2000, vol. 3953, Jan. 28, 2000 pp. 11–18, XP002182353 Proceedings of the SPIE—The Engineering, 2000 SPIE—Int. Soc. Opt. Eng., USA ISSN: 0277–786X (abstract).

* cited by examiner

*Primary Examiner*—Brian Healy
(74) *Attorney, Agent, or Firm*—Sughrue Mion, PLLC

(57) ABSTRACT

A dispersive optical waveguide array comprises a plurality of waveguide sections forming optical paths in parallel, each of the curved sections having the same curvature and the same section length around the curve.

10 Claims, 3 Drawing Sheets

DISPERSIVE OPTICAL WAVEGUIDE ARRAY

The invention relates to a dispersive optical waveguide array.

BACKGROUND OF THE INVENTION

Such arrays are known for use in multiplexers and demultiplexers and may comprise an array of optical waveguides of different pathlength thereby inducing phase changes between optical signals transmitted through the different waveguides within the array. Such systems may comprise a plurality of waveguides each arranged around a curved path so as to introduce different optical pathlengths. Such a system is for example shown in OPTICS LETTERS Jan. 1, 1995, volume 20, No 1.

Known systems of curved waveguides for a dispersive array may employ a plurality of curves of non-uniform radius of curvature. Such systems result in different physical pathlengths along the curve of each waveguide in the array. Furthermore the change of angle between the input and output end of each curved waveguide is not uniform for each of the waveguides in the array. These variations may cause unwanted signal variations between the light transmitted through the various waveguides in the array.

It is an object of the present invention to provide an improved waveguide array which reduces signal variations dependent on the particular waveguide within the array which is used to transmit the signal.

SUMMARY OF THE INVENTION

The invention provides a dispersive optical waveguide array comprising a plurality of optical paths of different optical pathlength arranged in parallel, which array includes a plurality of curved waveguide sections each of the curved sections having the same curvature and the same section length around the curve.

Preferably said curved sections are arranged so that optical axes of the inputs to the curved sections are all parallel to each other and the optical axes of the outputs of the curved sections are all parallel to each other.

Preferably input waveguide extensions are formed at the input end of the curved waveguide sections, the straight input waveguide extensions having different lengths from each other so that the input extensions have input ends aligned transverse to the optical input axes of the input waveguide extensions.

Preferably straight output waveguide extensions are formed at the output end of the curved waveguide sections, the straight output waveguide extensions having different lengths from each other so that the output extensions have output ends aligned transverse to the output optical axes of the output waveguide extensions.

Preferably a focussing element such as a curved mirror is provided to direct light into an input end of the array.

Preferably a focussing element such as a curved mirror is provided to direct light received from an output of the array.

The array may be integrated on a planar substrate.

The array may be formed as an integrated semiconductor chip.

The array may comprise a plurality of silicon on insulator waveguides.

The waveguides may be a plurality of ridge waveguides.

Preferably the waveguide array is formed as an integrated semiconductor chip and the or each mirror is formed by etching the semiconductor chip.

Preferably each mirror comprises a curved trench wall etched in the semiconductor.

The invention includes a dispersive optical waveguide array as aforesaid having at least one optical fibre connected to a waveguide coupled to one end of the array and a plurality of optical fibres connected respectively to a plurality of optical waveguides at the other end of the array.

Figure 1:
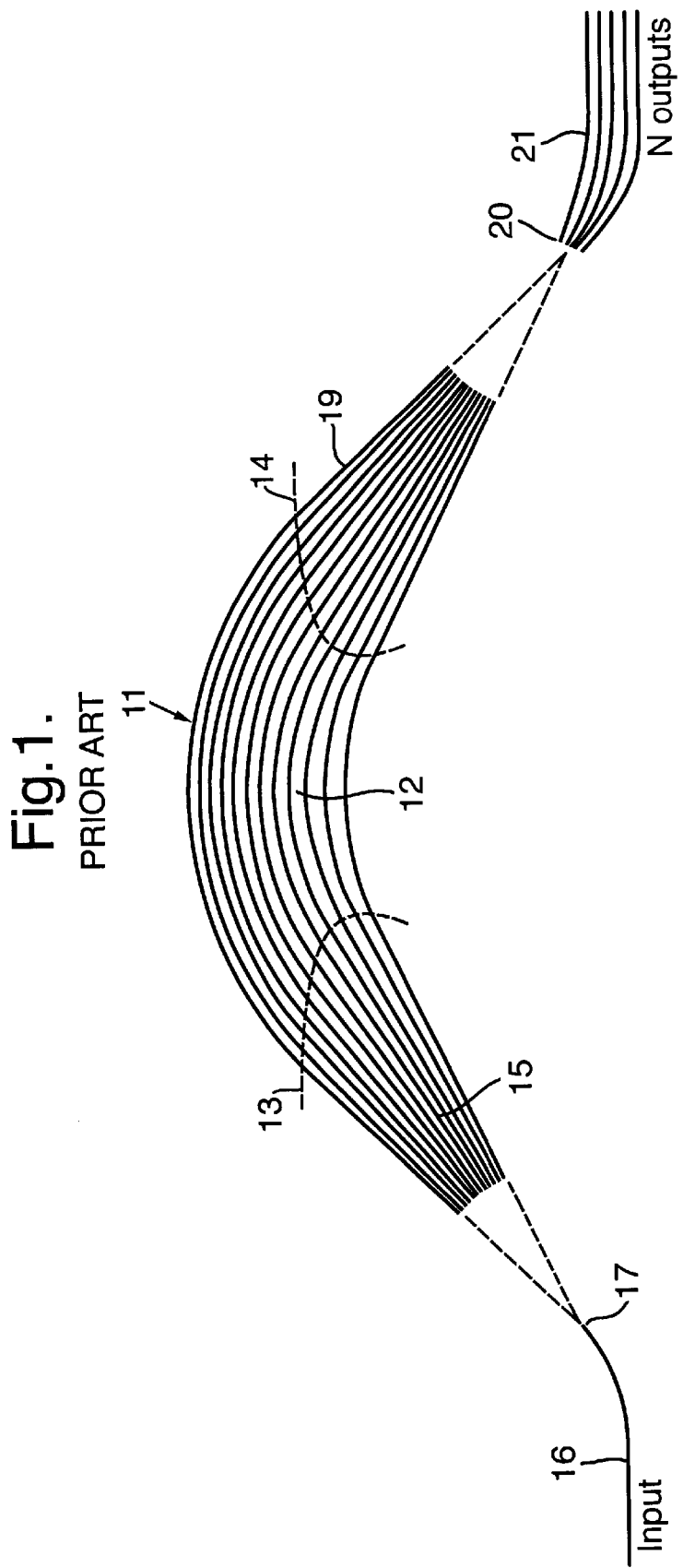
FIG. 1 represents a curved array of the type used in a prior art arrangement.

In the schematic prior art arrangement shown in FIG. 1, a dispersive waveguide array 11 consists of a plurality of curved waveguides 12 having their input ends terminating along line 13 and their output ends terminating along line 14. At the input end each waveguide is connected by a straight waveguide section 15 leading to an input 16. The straight waveguide sections 15 are all inclined towards each other so as to point to a focus 17 at the end of the input waveguide 16. Similarly the output ends of the curved waveguides at 14 are connected by straight waveguide extensions 19 which are again inclined towards each other so as to point at an output focus 20 adjacent a plurality of output waveguides 21. The curved waveguide sections 12 have a non-uniform radius of curvature as well as a non-uniform pathlength along the curved section. The angle through which light is bent between the input to each curved section and the output from that curved section is non-uniform for each of the curved waveguides 12. This non-uniformity will cause some signal changes for light transmitted through the respective channels which depends solely on these non-uniform properties of the curved waveguides, such as band loss, birefringence and lack of control of curved optical path length.

DESCRIPTION OF THE PREFERRED EMBODIMENTS

Figure 2:
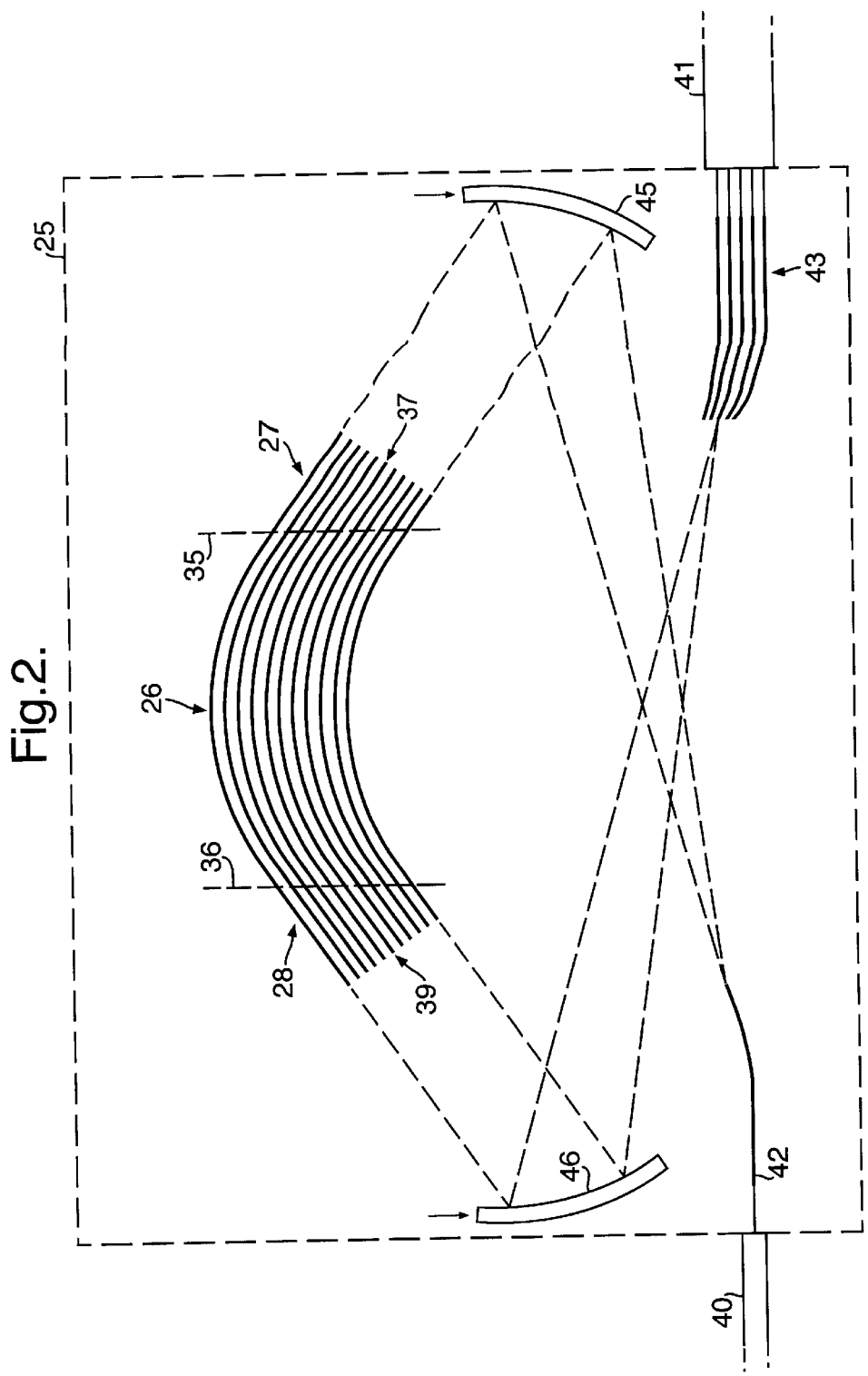
FIG. 2 shows an integrated semiconductor chip having a dispersive optical waveguide array in accordance with the invention.
Figure 3:
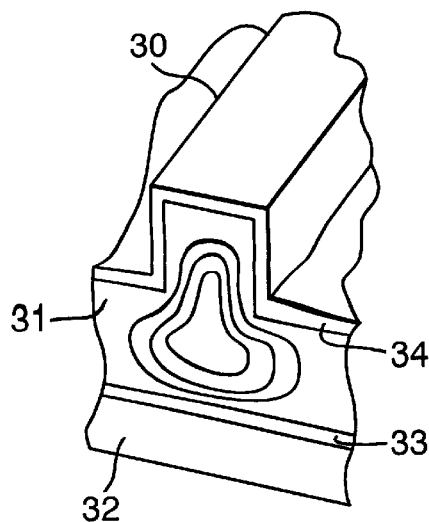
FIG. 3 shows a section through one waveguide used in the array of FIG. 2.

In the embodiment shown in FIG. 2, the curved waveguide sections are all identical. FIG. 2 relates to an integrated semiconductor chip 25 on which is formed the dispersive waveguide array which consists of curved sections 26 intermediate straight input waveguide extensions 27 and straight output waveguide extensions 28. The waveguides formed on this chip are of a known type of ridge waveguide formed from silicon on insulator. A section through one waveguide in the device of FIG. 2 is shown in FIG. 3. It will be understood that each of the waveguides shown in FIG. 2 may be formed as a ridge similar to the structure shown in FIG. 3. In FIG. 3 a ridge waveguide is formed as an upstanding rib 30 formed on a silicon layer 31. A silicon substrate 32 is covered with a silicon dioxide layer 33 immediately below the silicon layer 31. A silicon dioxide coating 34 is formed over the upper surface of the silicon 31 and over the rib 30. Optical signals are transmitted in a single mode through the silicon layer and rib 30 as shown in FIG. 2.

In the arrangement of FIG. 2, the curved waveguide sections 26 are formed as a plurality of curved waveguides side by side and with equal spacing between adjacent pairs of waveguides. They provide a plurality of light paths in parallel with each other. Each of the curved waveguides has the same radius of curvature and the same curved pathlength. The input ends of the curved waveguides are aligned along the line 35 and the output ends of the curved waveguide sections are aligned along line 36. The curved waveguides are formed with integrated input extensions 27 which are all straight and parallel to each other. They are of varying length so that the input ends 37 of the input waveguide extensions are aligned transverse to the optical axis of the light entering the dispersive array. Similarly the curved waveguides have integrated output extensions 28 which are each straight and parallel to each other. The length of the output extensions 28 is varied so that the output end 39 of the output extensions are aligned transverse to the output axis of light from the array.

The chip is provided with an input optical fibre 40 and a plurality of output optical fibres 41. These are arranged external to the chip 25 and are aligned with an input waveguide 42 and a plurality of output waveguides 43 with optical connections in known manner. Two curved mirrors 45 and 46 are formed on the semiconductor chip 25. Light from the input waveguide 42 is directed onto mirror 45 which reflects the input light onto the input end 37 of the dispersive array. It will be appreciated that the mirror 45 is focussed onto the input waveguide 42 so that the reflected light is collimated and directed in parallel manner into the dispersive array. Light which emerges from the output 39 of the dispersive array is parallel and reflected by mirror 46 so as to be focussed onto the respective output waveguides 43. The chip between the mirrors and the dispersive array acts as a slab waveguide.

It will be understood that the dispersive array shown in FIG. 2 may be used in an optical multiplexer or demultiplexer in which light signals of differing wavelengths are transmitted through the dispersive array and the phase difference induced in light passing through the different channels of the array may be used in operation as a multiplexer or demultiplexer. It will be understood that in the example of FIG. 2, the different optical pathlengths that are introduced in the dispersive array are caused by the different physical lengths of the straight parallel input and output waveguide extensions 27 and 28. The pathlength around the curved sections 26 is the same for each channel.

In the preferred example of FIG. 2 each of the mirrors 45 and 46 is formed by etching a mirror in the semiconductor of the chip 25. The etching may be used to form an etched trench having the required curvature for the two concave mirrors shown so as to produce the correct focussing requirements on the chip. Such etched trenches are formed with a reflecting trench wall in known manner.

It will be appreciated that by using the concave reflecting mirrors on opposite sides of the array, the physical space required on the semiconductor chip is reduced in order to implement the dispersive array with the required focussing distances between the input and output waveguides and the array itself.

Figure 4:
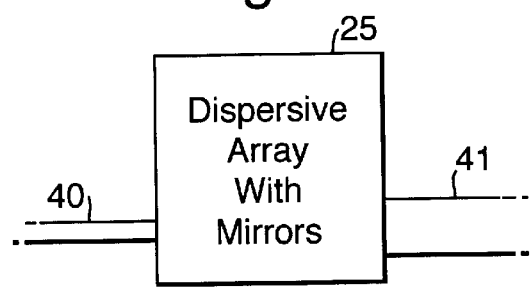
FIG. 4 shows a schematic view of a chip similar to FIG. 2.
Figure 5:
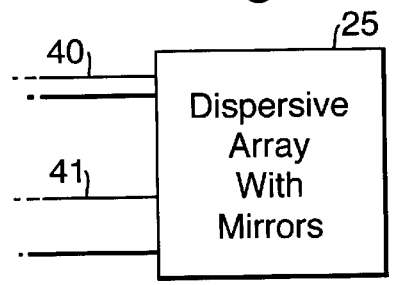
FIG. 5 shows a different schematic arrangement which may be used in accordance with the invention.

The system shown in FIG. 2 is illustrated schematically in FIG. 4 where the input fibre 40 and output fibres 41 are located on opposite sides of the semiconductor chip 25. However FIG. 5 shows an alternative arrangement in which the input fibre 40 and output fibres 41 are located on the same chip edge. This is achieved by etching suitable mirror locations on the chip in order to direct both the input and output light at the same chip edge. This may be used to simplify construction in that the fibre attachments to the waveguide chip are all formed from a common edge of the chip.

The invention is not limited to the details of the foregoing example. The array may be formed on other types of semiconductor chip and other optical arrangements may be used to admit light to, or receive light from, the array.

References to optical paths arranged in parallel herein are intended to distinguish over serial optical paths and this term is not intended to indicate that the waveguides providing said optical paths are geometrically parallel.

What is claimed is:

1. A dispersive optical device, including a dispersive waveguide array comprising a plurality of optical paths of different optical path length arranged in parallel, which array includes a plurality of curved waveguide sections, each of the curved sections having the same curvature and the same section length around the curve; and at least one curved focusing mirror for at least one of (1) directing an output of the array to at least one light-receiving element and (2) directing light into an input end of the array.

2. A device according to claim 1, wherein a curved focusing mirror is provided for each of directing an output of an array to at least one receiving element and directing light into an input end of the array.

3. A device according to claim 1 formed as an integrated semiconductor chip.

4. A device according to claim 2 formed as an integrated semiconductor chip and having an input and an output of the device provided at the same chip edge.

5. A device according to claim 1 formed as an integrated optic chip, and wherein the or each minor is formed by etching the optic chip.

6. A device according to claim 5, wherein the or each mirror comprises a curved trench wall etched into the optic chip.

7. A device according to claim 1, wherein the array comprises a plurality of silicon on insulator waveguides.

8. A device according to claim 1, wherein the array comprises a plurality of ridge waveguides.

9. A dispersive optical device according to claim 1 having an optical fiber connected to an input waveguide and a plurality of optical fibers connected respectively to a plurality of output optical waveguides.

10. A device according to claim 1 formed as an integrated chip, and including an input waveguide and a plurality of output waveguides integrated together with the waveguide array and the or each curved focusing mirror.

* * * * *